(12) United States Patent
Batchko

(10) Patent No.: US 7,218,430 B2
(45) Date of Patent: May 15, 2007

(54) COMBINATORIAL OPTICAL PROCESSOR

(76) Inventor: Robert G Batchko, 1426 Washington St., San Francisco, CA (US) 94109

( * ) Notice: Subject to any disclaimer, the term of this patent is extended or adjusted under 35 U.S.C. 154(b) by 720 days.

(21) Appl. No.: 10/029,399

(22) Filed: Oct. 19, 2001

(65) Prior Publication Data

US 2002/0158866 A1    Oct. 31, 2002

Related U.S. Application Data

(60) Provisional application No. 60/242,395, filed on Oct. 20, 2000.

(51) Int. Cl.
*G06E 3/00* (2006.01)
(52) U.S. Cl. .................. 359/107; 359/15; 359/380; 359/432
(58) Field of Classification Search ............... 359/15, 359/380, 432, 107; 349/200–202
See application file for complete search history.

(56) References Cited

U.S. PATENT DOCUMENTS

| | | | |
|---|---|---|---|
| 3,970,361 A | 7/1976 | Di Matteo et al. | 359/478 |
| 4,130,832 A | 12/1978 | Sher | 348/44 |
| 4,764,890 A * | 8/1988 | Hinton | 708/801 |
| 4,799,103 A | 1/1989 | Muckerheide | 348/51 |
| 4,834,473 A | 5/1989 | Keyes, IV et al. | 359/1 |
| 4,989,958 A | 2/1991 | Hamada et al. | 350/419 |
| 5,071,229 A | 12/1991 | Oaki et al. | 359/53 |
| 5,148,310 A | 9/1992 | Batchko | 359/479 |
| 5,150,234 A | 9/1992 | Takahashi et al. | 359/65 |
| 5,630,004 A | 5/1997 | Deacon et al. | 385/129 |
| 5,712,721 A | 1/1998 | Large | 359/245 |
| 5,751,452 A | 5/1998 | Tanaka et al. | 359/52 |

(Continued)

FOREIGN PATENT DOCUMENTS

GB    2171535    *   8/1986

(Continued)

OTHER PUBLICATIONS

Hecht-Zajac, Optics, Addison-Wesley, 1979, pp. 116.*

(Continued)

*Primary Examiner*—Leonidas Boutsikaris
(74) *Attorney, Agent, or Firm*—Joshua D. Isenberg; JDI Patent

(57) ABSTRACT

A Combinatorial Optical Processor and method for the architecture of optical systems utilizes one or more optical modules, each module including a number of individually addressable optical elements. The optical elements are arranged and addressed in a combinatorial-arithmetic fashion such that a set of optical filter functions are defined, and can be performed, by the optical modules. The number of optical filter functions may be an exponential function of the number of addressable optical elements. Additionally, each of the optical filter functions may be addressed at random and a plurality of such functions may be addressed simultaneously. Apparatus, such as imaging systems, may employ the Combinatorial Optical Processor in order to include without limitation the features of being solid-state, projection of images into free space and random addressability of the filter functions of the system. Combinatorial optical processing principles may be implemented as a method of optical digital to analog conversion. A free-space randomly-addressable interactive three-dimensional display system based on the Combinatorial Optical Processor is also described.

53 Claims, 7 Drawing Sheets

U.S. PATENT DOCUMENTS

| | | |
|---|---|---|
| 5,751,471 A | 5/1998 | Chen et al. .................. 359/319 |
| 5,764,317 A | 6/1998 | Sadovnik et al. ............... 349/5 |
| 5,768,242 A | 6/1998 | Juday .......................... 369/103 |
| 5,920,427 A | 7/1999 | Ogata .......................... 359/432 |
| 5,936,767 A | 8/1999 | Favalora ...................... 359/462 |
| 5,942,157 A | 8/1999 | Sutherland et al. .......... 252/582 |
| 5,990,990 A | 11/1999 | Crabtree ....................... 349/74 |
| 6,100,862 A | 8/2000 | Sullivan ....................... 345/88 |
| 6,115,151 A | 9/2000 | Popovich ....................... 359/9 |
| 6,178,020 B1 | 1/2001 | Schultz et al. ............... 359/107 |
| 6,183,088 B1 | 2/2001 | LoRe ............................. 353/7 |
| 6,185,016 B1 | 2/2001 | Popovich ...................... 359/15 |
| 6,211,976 B1 | 4/2001 | Popovich et al. .............. 359/15 |
| 6,295,145 B1 | 9/2001 | Popovich ...................... 359/15 |
| 6,304,263 B1 | 10/2001 | Chiabrera et al. .......... 345/419 |
| 6,317,190 B1 | 11/2001 | Winarski et al. ............ 349/200 |
| 6,320,635 B1 | 11/2001 | Matsui ........................ 349/133 |
| 6,323,970 B1 | 11/2001 | Popovich ........................ 359/4 |
| 6,329,963 B1 | 12/2001 | Chiabrera et al. ............. 345/6 |
| 6,356,366 B1* | 3/2002 | Popovich ...................... 359/15 |
| 6,359,674 B1 | 3/2002 | Horiuchi ..................... 349/200 |
| 6,377,229 B1 | 4/2002 | Sullivan ........................ 345/6 |
| 6,407,724 B2* | 6/2002 | Waldern et al. ................. 345/8 |

FOREIGN PATENT DOCUMENTS

| | | |
|---|---|---|
| GB | 2171535 | 8/1996 |
| WO | 0233657 | 4/2002 |

OTHER PUBLICATIONS

L. Vicari, "Liquid-Crystal Layer Between Rough Polymeric Surfaces", Journal of the Optical Society of America B, vol. 16, No. 7, Jul. 1999.

* cited by examiner

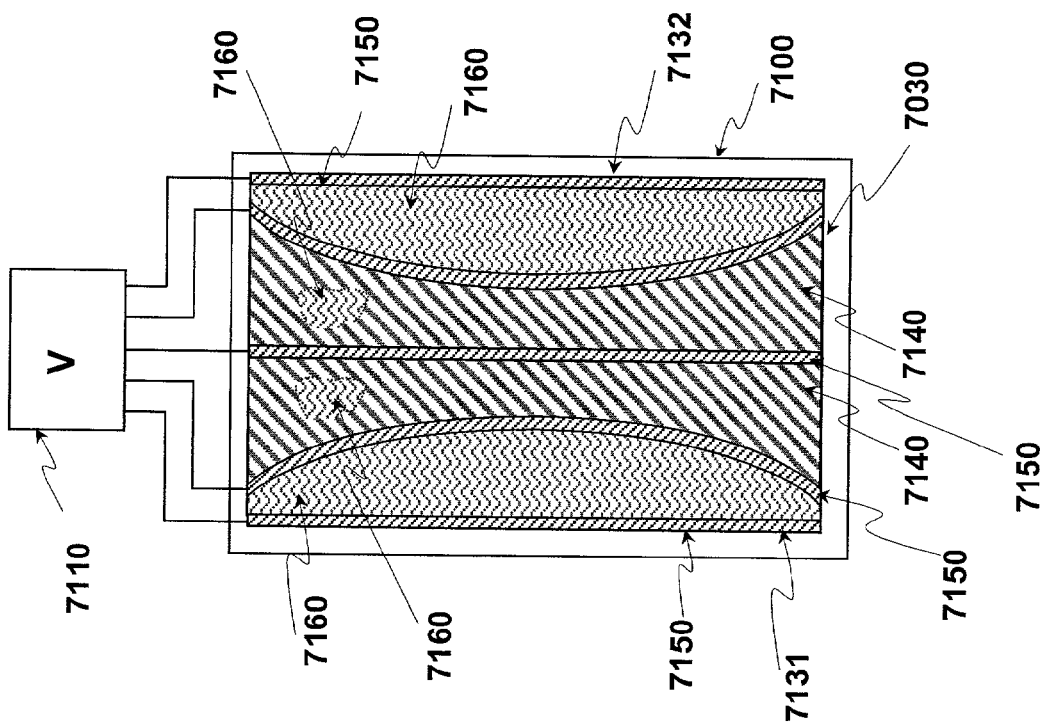
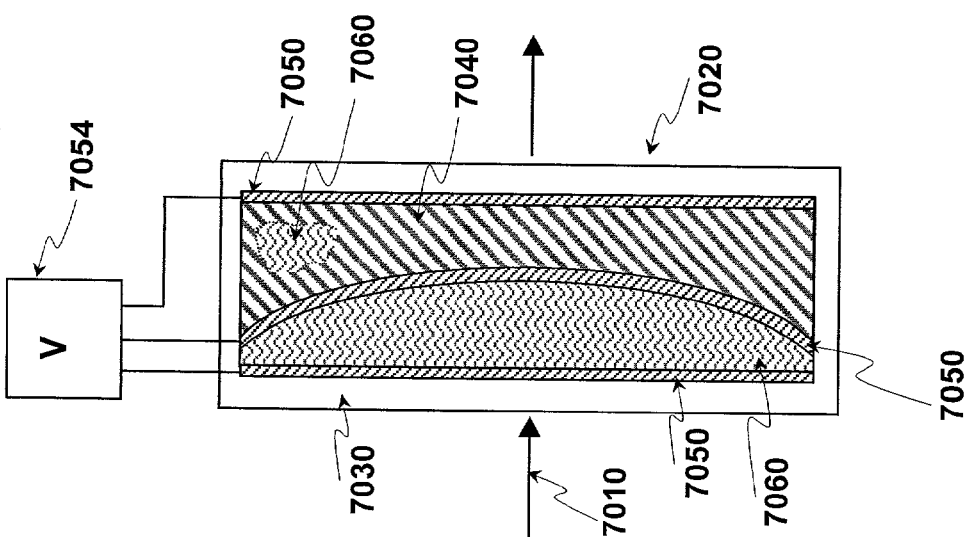
Fig. 7A
Fig. 7B

COMBINATORIAL OPTICAL PROCESSOR

This application claims the benefit of U.S. Provisional Patent Application No. 60/242,395 filed Oct. 20, 2000, the entire disclosure of which are incorporated herein by reference.

FIELD OF THE INVENTION

This invention relates to optical systems and more specifically to optical processors.

BACKGROUND OF THE INVENTION

In U.S. Pat. No. 5,148,310, "Rotating flat screen fully addressable volume display system," an angular multiplanar volumetric display system was described that solved a number of the problems related to the generation of three-dimensional (3-D) images. That invention, like others in its class, was based in part on the projection of scanned images onto a moving, and in this case, rotating, display screen. The benefits of multiplanar techniques over other methods for achieving 3-D imaging, include a wide field of view and observation without requiring the use of special viewing glasses.

Despite the benefits mentioned above, many problems still exist in the generation of practical 3-D displays. The first problem is that of making the entire system solid-state, i.e., having no moving parts.

Another problem is that the displayed images should exist in free space, i.e., wherein the display region is generally not enclosed or occupied by a substrate material.

Yet another problem is that an observer should be able to control the display system with the use of a physical pointer. Ideally, observers could control the display by merely reaching into the display region and "touching" desired 3-D image with their hand or finger.

A further problem is that the display should be widely scalable in parameters such as size, resolution, gray-scale and color. Fifth, the display should be simple to produce, compact and have relatively low cost.

Another problem is that any portion of the display region should be randomly addressable without dependence on a faster scan rate.

Still a further problem is that the refresh rate of the display should be scalable, beyond the 20–60 Hz requirement of human persistence of vision, to the range of kHz or faster for increased resolution and additional applications, i.e., such as machine vision, data storage, optical computing and optical networking, etc.

Above, several well-known problems that relate to the engineering of 3-D displays have been described; in fact, these problems are a subset of the broad challenges sweeping throughout many applications of optics in general.

OBJECTS AND ADVANTAGES

Accordingly, it is an object of the present invention to minimize the above problems by providing a combinatorial optical processing method for the architecture of optical systems, where the number of unique filter functions that a system can perform is an exponential function of the number of elements in the system.

It is an additional object of the present invention to provide a Combinatorial Optical Processor architecture where an optical system may have no moving parts.

It is an additional object of the present invention to provide an optical system architecture where one or more of the optical transformations of a system can be selected at random.

It is an additional object of the present invention to provide an optical system architecture where one or more of the optical transformations of a system can be performed in parallel.

It is an additional object of the present invention to provide an optical system architecture where an optical system has an output focal plane, and in which the transformations of the system include a unique set of locations for the output focal plane.

It is an additional object of the present invention to provide an optical system architecture where an optical system has an input focal plane, and in which the transformations of the system include a unique set of locations for the input focal plane.

It is an additional object of the present invention to provide an optical system architecture in which the transformations of an optical system include a unique set of powers of magnification.

It is an additional object of the present invention to provide an optical system architecture in which the transformations of an optical system include matrix operations.

It is an additional object of the present invention to provide an optical system architecture in which an optical system has an output focal plane, and where the spatial coordinates of a physical pointer or light source located in the proximity of the output focal plane can be detected by the system.

It is an additional object of the present invention to provide a combinatorial optics architecture for the design of 3-D display systems.

It is an additional object of the present invention to provide a combinatorial optics architecture for the design of optical imaging systems.

SUMMARY OF THE INVENTION

The disadvantages associated with the prior art are overcome by embodiments of the present invention directed to various applications of combinatorial optics.

In one embodiment, a combinatorial optics apparatus, includes one or more optical modules, at least one of which includes N addressable optical elements, where N is an integer greater than or equal to 1. The N addressable optical elements may be configured such that, depending on a state of each addressable optical element, the apparatus may provide at least $2^N$ addressable filter functions. Each of filter functions may produce a unique transform between an object and an image so that there are at least $2^N$ transforms, which may form a set of related transforms. The transforms may be related, e.g., such that an $n^{th}$ transform is related to an $(n+1)^{th}$ transform in the same way as an $(n-1)^{th}$ transform is related to the $n^{th}$ transform, wherein n is an integer between 1 and N−1. In some implementations of this embodiment, each of the transforms images an object at a different addressable output plane location. The output plane locations may lie along the same optic axis as the input plane and may be uniformly spaced apart. In other embodiments, the transforms may provide a set of addressable image magnifications or beam deflection angles. The N addressable optical elements may be randomly addressable. Each addressable optical element may be characterized two or more states, each state corresponding to a different value of an optical property, such as a focal length. Between 2 and N randomly addressable optical elements may be configured as a stack such that a total focal length of the stack $f_{tot}$ may be approximated by:

$$f_{tot} = \left( \frac{1}{f_1} + \frac{1}{f_2} \cdots \frac{1}{f_n} \right)^{-1},$$

wherein $f_1, f_2 \ldots f_n$ are the focal lengths of the n addressable optical elements.

The optical modules may include an optical medium having one or more subsections that define the one or more addressable optical elements. Two or more such modules may be linked and oriented relative to each other such that optical transforms may be performed along two or more axes relative to an axis of propagation. Such modules may be configured to perform as one-dimensional lenses such that two one-dimensional lens transforms are substantially perpendicular to each other to achieve transforms in two dimensions. In some embodiments, the optical medium may exhibit optical nonlinearities such as second and third order nonlinearities. The modules may further include one or more address beam sources that produce address beams that interact with corresponding subsections of the optical medium to alter one or more optical properties of the subsection. In some embodiments, the optical medium may include an electro-optic medium, such as a liquid crystal. The liquid crystal may have two or more states of refractive index as determined by an electric field applied across at least a portion of the electro-optic medium. One or more contact pads may be disposed proximate the optical medium. A voltage source coupled to one or more of the contact pads to provide an electric field for changing an optical property of the medium or a subsection thereof. One or more dispersed optics may be disposed proximate one or more of the contact pads or within the electro-optic medium. The dispersed optics may include one or more birefringent materials one or more optically isotropic materials.

According to another embodiment, a Combinatorial Optical Processing method may proceed by receiving an optical signal from an object at an apparatus having N randomly addressable optical elements, where N is an integer greater than or equal to 2; selecting a state for each of the N randomly addressable optical elements in the apparatus; and producing an image of the object using the randomly addressable optical elements. The image may be produced simultaneously at two or more output plane locations. Each optical element may have two randomly addressable states so that there are at least $2^N$ possible combinations of states for the N randomly addressable optical elements. The states may be selected, e.g., by providing a control signal to one or more of the N randomly addressable optical elements. Such a control signal may be a digital control signal such as an N-bit digital control signal. Each bit may correspond to a unique one of the N addressable optical elements, so that a value of a given bit determines a state of a corresponding one of the N addressable optical elements. The digital control signal may be converted to one or more analog optical outputs using one or more of the N randomly addressable optical elements.

According to another embodiment, a method for digital to analog optical conversion may be implemented by receiving a digital control signal at an apparatus having N randomly addressable optical modules; and processing a radiative object using one or more of the N randomly addressable optical modules to produce a radiative image. Each of the N randomly addressable optical modules may take on 2 or more different states, such that there are at least $2^N$ different possible transforms between the object and the image. Thus, the digital control signal determines the state of each of the N randomly addressable optical modules. The $2^N$ different possible transforms form an analog set. The analog set may include a sequence of transforms, e.g., such that an $n^{th}$ transform is related to an $(n+1)^{th}$ transform in the same way as an $(n-1)^{th}$ transform is related to the $n^{th}$ transform, wherein n is an integer between 1 and N−1.

Another embodiment provides an imaging system based on combinatorial optics. The imaging system includes one or more optical modules, at least one of which includes N addressable optical elements, where N is an integer greater than or equal to 1. The N addressable optical elements may be configured such that, depending on the state of each addressable optical element, the module may provide at least $2^N$ addressable image transform functions. The addressable image transform functions may provide $2^N$ addressable output plane locations for a given input plane location.

In another embodiment, two or more Combinatorial Optical Processors are optically coupled together to provide a linked Combinatorial Optical Processor. Each of the Combinatorial Optical Processors includes one or more optical modules having N addressable optical elements as described above. In such a linked system, a first system may be configured to optically process an object to produce a three-dimensional intermediate image. The object may be a two dimensional object or array of data. A second system may be configured to optically process the intermediate image to produce an image, which may be a three dimensional image. Alternatively, the first system may configured to optically process an object to produce a two-dimensional intermediate image, e.g., from a three-dimensional object. The second system may be configured to optically process the intermediate image to produce an image, such as a two dimensional image.

In another embodiment, two or more linked systems of the type described above may be optically coupled together to form a compound linked Combinatorial Optical Processor. Such a compound system may comprise two or more linked systems characterized by mutually orthogonal optic axes. The compound linked system may include a first linked system configured to optically process an object to produce a first intermediate image, such as a three-dimensional image. A second linked system may be configured to optically process the first intermediate image to produce a second intermediate image, which may be a three-dimensional image. The compound system may further include a third Combinatorial Optical Processor linked system of the type described above. The third linked system may be configured to process the second intermediate image to produce an image.

BRIEF DESCRIPTION OF THE DRAWINGS

The teachings of the present invention can be readily understood by considering the following detailed description in conjunction with the accompanying drawings, in which:

FIG. 7A depicts cross-sectional view of an optical module for use in a Combinatorial Optical Processor according to an embodiment of the present invention; and FIG. 7B depicts a cross-sectional view of an alternative optical module for use in a Combinatorial Optical Processor according to an embodiment of the present invention.

DETAILED DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention. Like numbers refer to like elements throughout.

The implementation of combinatorial optical processing architecture in the design of optical systems can enable the creation of optical systems having properties that may include without limitation the ability to be dynamically reconfigured, random addressability of a number of possible states and the use of all, or a number of, solid-state components. For example, a variable-focal-length telescope based on a combinatorial optical processor (combinatorial optical telescope) may designed to have a range of focal lengths from 10 km to 1000 km. Further, the Combinatorial Optical Telescope may be designed to have the property of random selectability of the focal length at any distance within its range and with 0.1 km resolution. Further, the desired focal length may be randomly selected without requiring the delay associated with mastering through a set of focal lengths.

Figure 1:
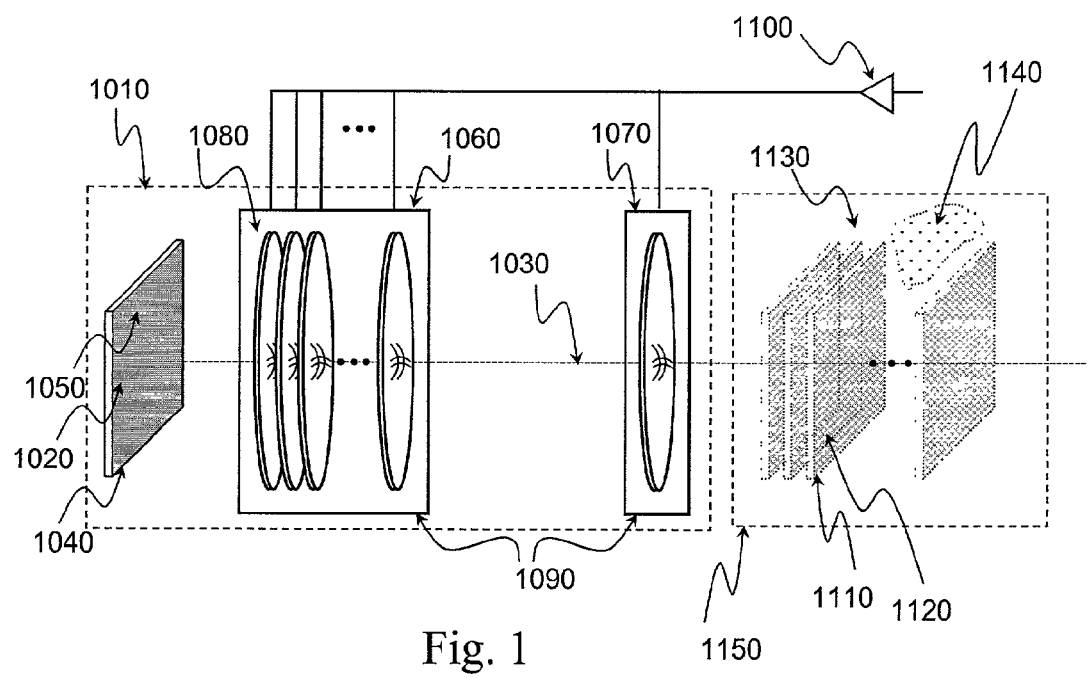
FIG. 1 is a schematic diagram of an imaging system based on combinatorial optics according to an embodiment of the present invention.

By way of example, FIG. 1 shows one possible embodiment of an imaging system (1010) based on a combinatorial optical processor. The system (1010) may optically process an object (1050) and produce an image (1120). The system (1010) generally includes one or more optical modules (1090), e.g., a first optical module (1060) and a second optical module (1070), which may be positioned generally along a system axis (1030). One or more of the first module (1060) or second module (1070) may include one or more addressable optical elements (1080). As used herein, addressable means that the one or more optical properties of the addressable optical elements (1080) may be changed, e.g., in response to a control signal (1100). The addressable optical elements (1080) may include, incorporate or utilize without limitation: static or dynamic optical elements such as refractive, diffractive and binary optic lenses, micro-optic lenslets, bragg gratings, prisms, holographic optical elements, liquid crystals, ferroelectrics, semiconductors, electro-optics, acouto-optics, polymers, optical coatings, mirrors, adaptive optics, nonlinear optics and any other optical elements known in the art. It will be well understood by those with average knowledge in the art that any number of optical modules (1090) and addressable elements (1080) may be utilized in the system (1010), that and that the optical axes, as understood in the art, of each Module and Element may or may not be oriented collinearly with respect to each other. The addressable elements (1080) and modules (1090) may be configured to provide a set of unique optical transforms such as image distance transforms, object distance transforms, image magnification transforms, image plane curvature transforms, object plane curvature transforms, angular beam deflection transforms, and beam spot size transforms. In general, if there are N addressable optical elements (1080) and Y different possible states for each element, the module (1030) may provide $Y^N$ possible optical transforms for the object (1050). In one embodiment, Y is greater than or equal to 2 such that there are at least $2^N$ different possible transforms.

Any number of the modules (1090) and addressable optical elements (1080) may be actively addressed, controlled or modified by the module control signal (1100). In this fashion, the state of the control signal (1100) may determine the optical states or properties of the modules (1090) and addressable optical elements (1080), and hence, the optical properties of the system (1010). The control signal (1100) may enable the independent control, or "random access", of any or all of the addressable optical elements (1080). The control signal (1100) may include signals that may include without limitation, electronic signals including standard voltages for TTL, CMOS and ECL, optical signals including continuous-wave or mode-locked laser pulses, magnetic signals, acoustic signals and mechanical movement.

In one embodiment, an object source (1040) may generate the object (1050). As used herein, the term object may be understood as a set of radiation emitted from the object source (1040). The object source (1040) may include without limitation image displays utilizing technologies such as liquid crystal (LC), microelectromechanical systems (MEMS), laser, light emitting diode (LED), cathode ray tube (CRT), optical telescopic, image relay, holographic or any other method of generating, projecting or imaging optical images. The object (1050) may be positioned on or away from an input focal plane (1020) that intersects the system optical axis (1030). The modules (1090) interact with light from the object (1050) to produce a related image (1120) of the object (1050). The properties of the image depend, in part, on the optical properties of the addressable elements (1080), modules (1090) and system (1010). Since these properties may change in response to the control signal (1100), the image may change in response to the control signal (1100). The system may produce the image (1120) at an output focal plane (1110), which may generally proceed the second module (1070) and which may intersect the system axis (1030). Properties of the output plane (1110), including without limitation, optical properties such as position, magnification and aberrations, may be modified by variation of the states of the control signal (1100), modules (1090) and elements (1080).

In an embodiment of the present invention, a set of output plane locations (1130) may comprise a number of discrete locations along the system axis (1030). In this fashion, the output plane (1110) may be positioned at any of the output plane locations (1130) by the use of an appropriately defined Control Signal (1100). As will be further described below, the output plane (1110) may be randomly positioned at any output plane location (1130) by the use of an appropriately defined control signal (1100). In this fashion, the image (1120) may be randomly projected on any output plane location (1130). Such random imaging of the Image (1120) at any output plane locations (1130) may have applications in areas that include, without limitation, imaging and tracking of moving objects, image displays, optical networking and optical computing.

In an embodiment of the present invention, the output plane locations (1130) may be uniformly spaced adjacent to one another. Further, the magnification of the image (1120) may be a constant value independent of which output plane location (1130) the image (1120) is positioned on. Furthermore, the output plane (1110) may be simultaneously positioned at one or more output plane locations (1130) by the use of an appropriately defined Control Signal (1100). Simultaneous imaging at multiple output plane locations can be accomplished by addressable optical elements (1080) that include without limitation variable-efficiency diffractive optics, holographic optical elements and nonlinear optics. Such optics may include without limitation, holographic optical elements imbedded in electrically-activated liquid crystal or electrooptic diffractive optical elements in domain-patterned ferroelectric materials. In this fashion, the image (1120) may be simultaneously projected on multiple output plane locations (1130). Such simultaneous imaging of the Image (1120) at multiple output plane locations (1130) may have applications in areas that include, without limitation, image displays.

In the present embodiment of the invention, the image (1120) may be a real or virtual image projected into free space. However, other embodiments may additionally incorporate apparatus for enhancing the image (1120). For example, an imaging medium (1140) may be dispersed to coincide with at least a portion of output plane locations (1130). The imaging medium (1140) may thus serve to enhance or provide visibility, or to expand or modify the scattering angle, of the light comprising the image (1120). In this fashion, the imaging medium may serve as one or more point sources of light. Such an imaging medium (1140) may include without limitation light scattering particles including microscopic glass beads, liquid vapor, and ionized or fluorescing gases. In other embodiments of the invention, the imaging medium (1140) may be at least partially contained within an imaging chamber (1150). Such an imaging chamber (1150) may include without limitation one or more transparent glass or plastic tanks, pressurized tanks, tanks with electric voltages, fields or currents applied across at least a portion thereof. In other embodiments of the invention, light from the image (1120) may be used to excite at least a portion of imaging medium (1140), thereby causing imaging medium (1140) to radiate light.

Figure 6:
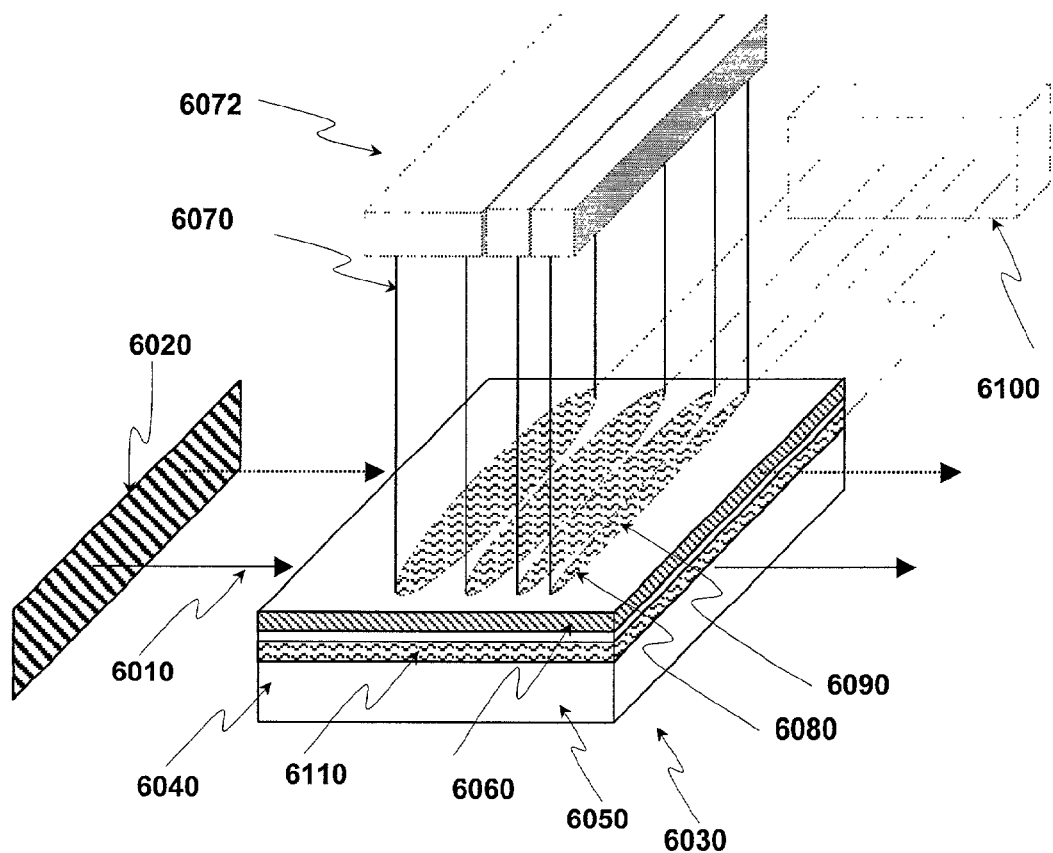
FIG. 6 depicts a schematic diagram of an optical module for use in a Combinatorial Optical Processor according to an embodiment of the present invention.

The addressable optical elements (1080) and modules (1090) described above may be of many possible types. FIG. 6 illustrates potential embodiments of components that may be used as the elements (1080) and modules (1090). An Object (6010) is generated by an object source (6020). The object source (6020) may include a collimated or focused point source such as a laser, linear, two- and three-dimensional arrays of such point sources, and images of such point sources. Object (6010) may propagate through a module (6030). The module (6030) may include without limitation an optical medium (6040) such as a nonlinear optical medium. Subsections of the medium (6040) define one or more addressable elements (6080). The optical properties of the medium (6040) and the addressable elements (6080) may be altered by suitable control signals. The elements (6080) in the module (6030) may be activated by techniques including without limitation optical addressing and electro-optic addressing. Properties of the optical medium (6040) may include without limitation second and third order nonlinear optical nonlinearities such as $KH_2PO_4$ KDP and $LiNbO_3$ (lithium niobate). The module (6030) may include without limitation bulk optics (6050) and waveguides (6060). For example, one or more optical address beams (6070) may propagate into the medium (6040) thereby illuminating at least a portion of medium (6040). The beams may be produced by one or more sources (6072) such as lasers, mode-locked lasers, Q-switched lasers, laser amplifiers, optical parametric oscillators, amplifiers and generators. Inside the medium (6040), the optical address beams (6070) may address the elements (6080) by techniques including without limitation self-induced index modulation and Kerr lensing, wherein properties of the optical address beams (6070) such as the beam profile, intensity, power, wavelength, pulse shape and pulse duration may affect the optical properties, and therefore the states, of elements (6080).

Alternatively, the electro-optic effect may be utilized to activate elements (6080). In such case, one or more electrically conducting contact pads (6090) may be positioned in or adjacent to at least portions of Medium (6040). A voltage source (6100) may be connected to the contact pads (6090) and a reference electrode (6110). In this fashion, an electric field appearing across a portion of medium (6040) may be utilized to modify the refractive index, and the states of the elements (6080). The size and shape of the contact pads (6090) may be suitably chosen to obtain the desired state. The voltage source (6100) may independently address each of the electrodes so that, if there are N electrodes and Y different possible states for each electrode, the module (6030) may provide $Y^N$ possible optical transforms for the object (6010). In one embodiment, Y is greater than or equal to 2 such that there are at least $2^N$ different possible transforms.

A plurality of modules (6030) may be linked and oriented relative to each other in order to enable optical transforms to be performed along a plurality of axis relative to the axis of propagation of the object (6010). For example, if module (6030) performs the optical transform of a one-dimensional lens, e.g., a cylindrical lens, then a second module, also acting as a one-dimensional lens, may be linked to module (6030). The two modules may then be relatively oriented such that the two effective one-dimensional lenses are at 90 degrees to each other. In this fashion, optical transforms in two dimensions can be achieved. FIGS. 7A–7B illustrate optical modules that may be used as additional potential embodiments of the elements (1080) and the modules (1090). In FIG. 7A, an object (7010) propagates into a module (7020). The module (7020) may include without limitation one or more electro-optic elements (7030) such as stacks of liquid crystals. The elements (7030) may have two or more different states or optical properties. In one embodiment, the element (7030) may include electro-optic medium (7040). The electo-optic medium (7040) may include without limitation a liquid crystal and may have two or more states of refractive index as determined by an electric field applied across at least a portion of the medium (7040). At least a portion of the medium (7040) may be positioned in between two or more electrically-conducting contact pads (7050). The contact pads (7050) may be at least partially transparent to light or other radiation comprising object (7010) and may include materials and thin films such as indium tin oxide. The contact pads (7050) may be connected to a voltage source (7054), thereby enabling the application of an electric field across at least a portion of the electro-optic medium (7040). One or more dispersed optics (7060) may be positioned in or adjacent to the contact pads (7050). Alternatively, the dispersed optics (7060) may be positioned in or adjacent to the medium (7040). The dispersed optics (7060) may include without limitation refractive, diffractive and binary optic lenses, micro-optic lenslets, bragg gratings, prisms, holographic optical elements, liquid crystals, ferroelectrics, semiconductors, electro-optics, polymers, thin films, glass and plastic. On or more of the contact pads (7050) may be curved to provide a curved interface between the dispersed optics (7060) and the electro-optic medium (7040).

At least a portion of the dispersed optics (7060) may have a generally fixed refractive index. In this fashion, the electro-optic medium (7040), being in a first state of refractive index, as a result of a first applied electric field, may be generally index matched with at least a portion of the dispersed optics (7060). In this case, the element (7030) will have a first optical property. For example, the first optical property of Element (7030) may be a first focal length or focal power. Further, Medium (7040), being in a second state of refractive index as a result of a second applied electric field, may have a refractive index different from that of Dispersed Optics (7060). In this case, Element (7030) will have a second optical property. For example, the second optical property of Element (7030) may be a second focal length or focal power.

Alternatively, dispersed optics (7060) may include one or more birefringent materials such as calcite, and one or more optically isotropic materials such as diamond. In this embodiment, the various refractive indices and relative orientations of the materials comprising dispersed optics (7060) may be chosen such that, along a first polarization axis the materials comprising dispersed optics (7060) have a common refractive index, and along a second polarization axis, the materials comprising dispersed optics (7060) have two or more refractive indices. The materials comprising dispersed optics (7060) may be shaped such as to provide a first optical transform for light of object (7010) having a first polarization, and to provide a second optical transform for light of object (7010) having a second polarization. Contact pads (7050) electro-optic medium (7040) may include polarizers and polarization rotators such as dichroic films, liquid crystal and electro-optic half-wave plates. In this fashion, light of object (7010) may be selectively polarized such that module (7020) may perform a plurality of optical transforms on object (7010).

FIG. 7B illustrates an optical module (7100) comprised of two or more elements (7130) having features in common with the element (7030) described above with respect to FIG. 7A. The elements (7130) may be configured in arrangements including without limitation stacks and arrays. The optical properties of Elements (7130) may be determined by a voltage source (7110) connected to the elements (7130). In one embodiment, the elements (7130) may include a first element (7131) and a second element (7132). The first element (7131) and second element (7132) may include electro-optic media (7140), contact pads (7150) and dispersed optics (7160) configured in a manner similar to that described above with respect to FIG. 7A. In the example shown in FIG. 7B the first element (7131) and second element (7132) may be mirror images of each other placed back to back. The first element (7131) and the second element (7132) may be addressed individually and in parallel by the voltage source (7110). The first element (7131) may have a first optical property and a second optical property. The second element (7130) may have a third optical property and a fourth optical property. In this fashion, the various combinations of optical properties of the Elements may define a set of optical functions that Module (7100) may perform. For example, optical properties of module (7100) may include without limitation a set of focal lengths.

Figure 2A:
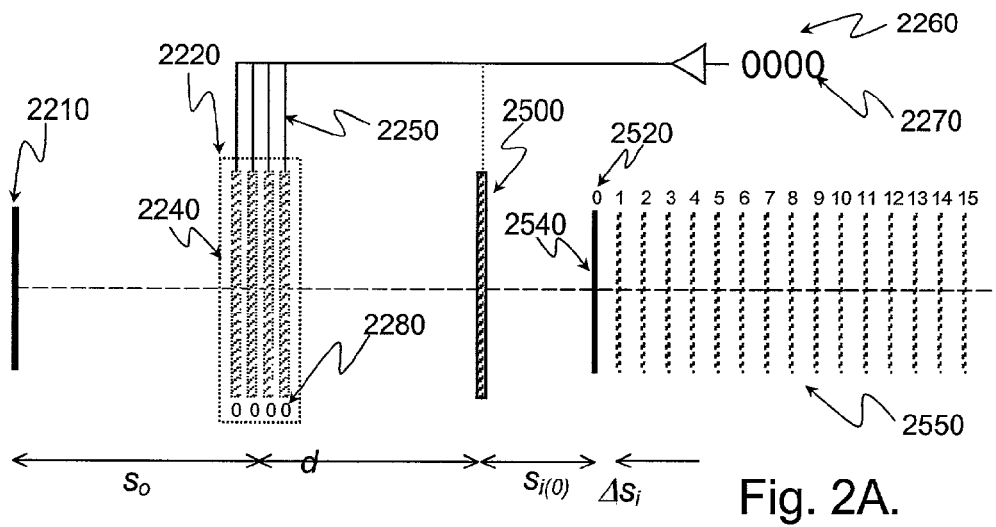
FIGS. 2A–2C depict schematic diagrams that illustrate an imaging system in three different states according to an embodiment of the present invention.

Combinatorial optical processing architecture of the type shown in FIG. 1 may find application in imaging systems. FIG. 2A shows a schematic illustration of one potential embodiment of an imaging system (2200) based on Combinatorial Optical Processor architecture. Common approximations, known to optical engineering may be used for the purpose of simplification. Such approximations may include without limitation, paraxial, plane wave, thin lens and monochromatic approximations, however, analytical and numeric modeling techniques may be incorporated as well. The system (2200) generally includes a first module (2220) having N addressable optical elements (2240), where N is an integer greater than 1. Although the first module (2220) may contain any number N≧2 of addressable elements (2240), in the examples depicted in FIGS. 2A–2C four addressable optical elements are used, i.e., N=4, to illustrate the principle of operation. The system (2200) may include a second optical module (2500) that is optically coupled to the first optical module. As illustrated in FIG. 2A, the first module (2220) and second module (2500) may be separated by a module separation Distance, d.

Each of the addressable elements may be in one of 2 or more addressable states such that there are at least $2^N$ different possible configurations for the states of the N addressable optical elements (2240). Each configuration of the N addressable optical elements provides a different transform or filter function for the object (2210). The addressable optical elements (2240) may be randomly addressable. As used herein, randomly addressable means that the set of N addressable optical elements may change from one configuration to another configuration without necessarily passing through any intermediate configurations.

Figure 2B:
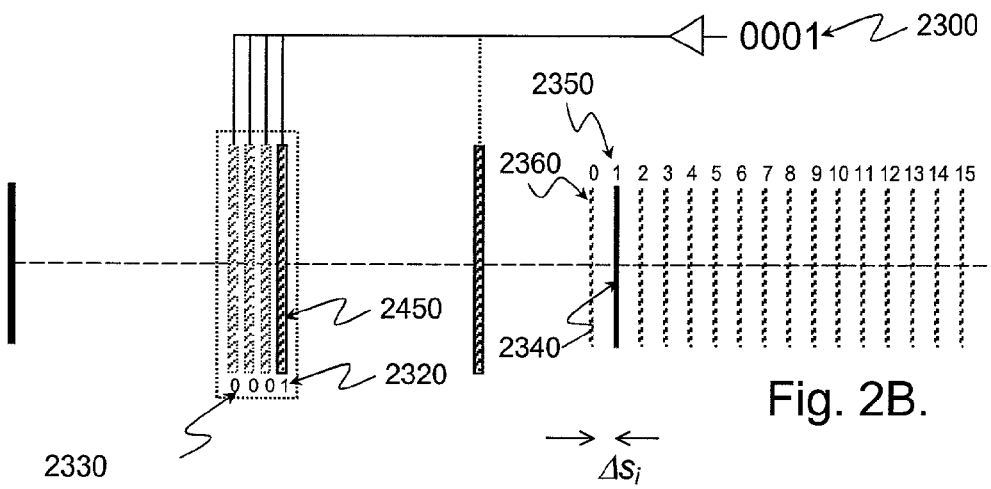
Figure 2C:
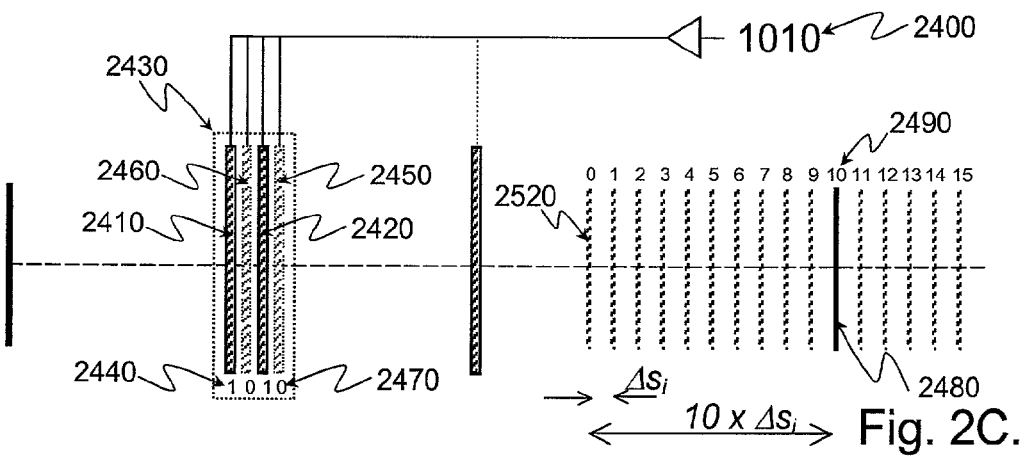

In the example depicted in FIGS. 2A–2C, each different transform produces an image of an object (2210) at a different output plane location (2550). Each of the output plane locations (2550) may be uniformly separated by an output plane separation constant, $\Delta s_i$. Thus, the system 2200 images an object (2210) at one or more addressable output plane locations (2550). The object (2210) and first Module (2220) may be separated by an Object Distance, $S_o$. The addressable optical elements (2240) may be approximated as a stack of thin spherical lenses, where the principal axes of all lenses may be positioned coincidental to one another and where each lens may be positioned in contact with adjacent lenses in the stack. In this fashion, the first module (2220) can also be approximated as a thin lens. Further, the focal length of the first module (2220) can be approximated as the inverse of the sum of the inverse focal lengths of each of the Elements (2240) contained in the First Module (2220).

By way of example, as is well known in any typical undergraduate-level optics text book, if a stack of thin lenses, $L_1 \ldots L_n$, with corresponding focal lengths, $f_1 \ldots f_n$, are arranged next to each other with no separation between each lens, then the focal length of the total stack, $f_{tot}$, can be approximated as $$f_{tot} = \left(\frac{1}{f_1} + \frac{1}{f_2} \cdots \frac{1}{f_n}\right)^{-1}.$$

The addressable optical elements (2240) may be connected to one or more control conduits (2250), through which a control signal (2260) may be delivered to the elements (2240). The control conduits (2250) may comprise electrically conductive paths for delivering electrical signals to the addressable optical elements. However, the control conduit (2250) may also include without limitation means for delivering signals that are optical, thermal, mechanical, magnetic or of any other type in nature. By way of example, the control signal (2260) may comprise an electric signal. However, the control signal (2250) may also include without limitation signals that are optical, thermal, mechanical, magnetic or of any other type in nature.

The control signal (2260) may include without limitation a digital sequence of control bits (2270). The control bits (2270) may carry information corresponding to the addressing and control of the addressable optical elements (2240). Each addressable optical element (2240) may be addressed and controlled by one or more bits (2270). The bits (2270) may be comprised of binary data signals. In this fashion, each Bit (2270) may correspond to, and be utilized to address, a unique Element (2240). Further, as will be understood by those with average knowledge in the art, a Bit (2270) with the digital value, "0", may result in a corresponding Element (2240) being set to its "off" state. Likewise, a Bit (2270) with the value, "1", may result in a corresponding Element (2240) being set to its "on" state. For example, if an addressable Element (2240) utilizes a holographic optical element, such as a lens, incorporated within a liquid crystal structure, as understood in the art, then, in the "on" state, the Element may act as a lens with a defined focal length. Alternatively, in the "off" state, the holographic optical element may be index-matched to the liquid crystal, and, in such fashion, may have an infinite focal length. The incorporation of holographic optical elements within liquid crystals is known in the art.

By way of example, FIG. 2A illustrates a possible Control Signal (2260) comprised of the four-bit sequence, 0000. The Bits (2270) may be directed to the First Modules (2220) via the Control Conduit (2250). Each of the bits (2270) may address an individual Element (2240). In the example depicted in FIG. 2A, every Element (2240) may be addressed by a bit (2280) having the digital value "0" and may thus be set to the "off" state. Elements (2240) in the "off" state are illustrated in FIG. 2A by the use of dashed lines. In this configuration, the system 2200 produces an image (2540) of the object (2210) at an output location 0 (2520). The Second Module (2500) may be separated from an Output Plane Location 0 (2520) by an Initial Image Distance, $s_{i(0)}$.

As another example, FIG. 2B illustrates a possible Control Signal (2300) comprised of the four-bit sequence, 0001. In this case, a first element (2450) may be addressed by a Bit (2320) having the value "1" and may thus be set to the "on" state. The remaining three Elements, may thus be addressed by Bits (2330) having the value "0", and may thus be set to the "off" state of the First Element (2450) is illustrated in FIG. 2B by the use of solid lines. In this fashion, an image (2340) may appear at an Output Plane Location 1 (2350). Output Plane 1 (2350) may be located at a distance past Output Plane 0 (2360) generally equal to one Output Plane Separation Constant, $\Delta s_i$.

As another example, FIG. 2C illustrates a possible Control Signal (2400) comprised of the four-bit sequence, 1010. In this case, a fourth element (2410) and a second element (2420) from the right-hand side of the first module (2430) may be addressed by bits (2440) having the value "1" and, as such, may be set to the "on" state. The first element (2450) and a third Element (2460) in the first module (2430), may be addressed by bits (2470) having the value "0", and, as such, may be set to the "off" state. In this fashion, an image (2480) may appear at an Output Plane Location 10 (2490). Output Plane 10 (2490) may be located at a distance past Output Plane 0 (2520) approximately equal to ten times the Output Plane Separation Constant, $\Delta s_i$.

Thus, in the fashion described above, every element and combination of addressable optical elements (2240) may be independently controlled or addressed.

In FIGS. 1 and 2A–2C above, some basic examples were presented describing the layout and functionality of some possible embodiments of systems based on Combinatorial Optics. A possible method for designing such Combinatorial Optical Processors is described below.

Summarizing the embodiment depicted in FIGS. 2A–2C, an Imaging System based on Combinatorial Optics may include, without limitation, the variables described in Table I below.

TABLE I

| Variable | Name | Description |
| --- | --- | --- |
| $s_o$ | Object Distance | The distance of separation between the Object and the First Module |
| $F_1$ | First Module Focal Length | The combined focal length of all Elements in the First Module |
| N | Total Number of Elements | The total number of individually addressable optical Elements |
| n | Element Index | Each individual Element is given an index number |
| $F_2$ | Second Module Focal Length | The Focal Length of the Second Module |
| D | Module Separation Distance, | The distance of separation between the First and Second Modules |
| $f_{1(n)}$ | Focal length in the "on" state of Element n in the First Module | Focal length of Element n in the First Module |
| Q | Total number of Output Plane Locations | Total number of Output Plane Locations |
| $\Delta s_i$ | Output Plane Separation Constant | Output Plane Separation Constant |
| $s_{i(0)}$ | Initial Image Distance | Initial Image Distance |
| m | Output Plane Index | Output Plane Index |
| M | Transverse Magnification | Magnification ratio between the heights of the Object and Image. |
| $s_i$ | Image Distance | The distance of separation between the Image and the Second Module |

By setting the system parameters as $$M = \frac{-d}{s_o},$$

$$F_2 = d,$$

and

-continued $$s_i = \frac{d^2}{s_o} - \frac{d^2}{F_1} + d.$$

The Initial Image Location $s_{i(0)}$ may be addressed when $F_1=\infty$, e.g., $$s_{i(0)} = \frac{d^2}{s_o} + d.$$

For each Element n, a unique focal length $f_{1(n)}$ may be specified as $$f_{1(n)} = \frac{-d^2}{2^n \Delta s_i}.$$

For the case when only a single Element n is activated, the focal length of the First Module $F_1$ may be expressed as $$F_1 = \left(\frac{1}{f_{1(n)}}\right)^{-1} = f_{1(n)}.$$

In this fashion, the activation of Element n may result in the addressing of a corresponding Output Plane Location m, where n and m are related by the expression $$m=2^n.$$

For the case of the simultaneous activation of multiple Elements 0,1 . . . n, the focal length of the First Module $F_1$ may be expressed as $$F_1 = \left(\frac{1}{f_{1(0)}} + \frac{1}{f_{1(2)}} \cdots \frac{1}{f_{1(n)}}\right)^{-1}.$$

In this case, the corresponding Output Plane Location m addressed by the activation of Elements 0,1, n may be given as $$m=2^0+2^1 \ldots 2^n.$$

In this manner, each Output Plane Location m may correspond to a unique Control Signal. Hence, the Combinatorial Optical Processor may function to optically decode a binary-formatted Control Signal to a decimal-indexed Output Plane Location m. Combinatorial Optics may thus be utilized to optically perform the functions of binary-to-decimal and decimal-to-binary conversion.

In this fashion, each Output Plane Location m may be addressed by the activation of a corresponding combination of Elements. Combinatorial Optical Processors may therefore utilize the combinatorial addition of activated optical Elements in an optical system in order to address an Image at a plurality of Output Plane Locations.

By way of numerical example, the method of engineering a system similar to the one described in FIGS. 2A–2C will now be elucidated. For this example, the system described in FIG. 2A–2C may have the values:

d=15 mm $\Delta s_i$=0.1 mm $s_o$=7.5 mm

N=4 n=0,1,2,3.

In the de-activated (or, "off") state, each Element may have an infinite focal length, $f_{1(n)}$(off)=∞ mm.

Then it can be shown from the above expressions that, for example,

Q=16

M=−1.5

$s_{i(0)}$=45 mm and $F_2$=15 mm.

As further example, possible values for the addressable optical elements employed in the first module (2220) are given in Table II below.

TABLE II

| Element index, n | Element, $f_{1(n)}$ | Focal length of $n^{th}$ Element in activated state, $f_{1(n)}$ (on) | Focal length of $n^{th}$ Element in de-activated state, $f_{1(n)}$ (off) |
| --- | --- | --- | --- |
| 0 | $f_{1(0)}$ | −2250 mm | ∞ mm |
| 1 | $f_{1(1)}$ | −1125 mm | ∞ mm |
| 2 | $f_{1(2)}$ | −562.5 mm | ∞ mm |
| 3 | $f_{1(3)}$ | −281.25 mm | ∞ mm |

Now, the above values may be applied the system of FIG. 2A–2C. For the a Control Signal (2260) 0000 illustrated in FIG. 2A, Elements $f_{1(0)}$, $f_{1(1)}$, $f_{1(2)}$, $f_{1(3)}$ may be in the de-activated state and therefore may have infinite focal lengths. Likewise, the focal length for the First Module may be generally infinite, e.g., $$F_{1(0000)} = \left(\frac{1}{\infty} + \frac{1}{\infty} + \frac{1}{\infty} + \frac{1}{\infty}\right)^{-1} = \infty \text{ mm.}$$

Using the expression for $s_i$ given above, the Image may be addressed at Output Plane m=0, a location 45.0 mm from the Second Module.

Next, as described above and illustrated in FIG. 2B, a Control Signal having the value 0001 may result in the activation of Element n=0 and the de-activation of Elements n=1–3. Therefore, from the expression above, the focal length for the First Module may be given as $$F_{1(0001)} = \left(\frac{1}{\infty} + \frac{1}{\infty} + \frac{1}{\infty} + \frac{1}{f_{1(0)}}\right)^{-1} = -2250 \text{ mm.}$$

The Image may be addressed at Output Plane m=1, a location 45.1 mm from the Second Module.

As another example of Combinatorial Optics in the system described above and illustrated in FIG. 2C, a Control Signal having the value 1010 may result in the activation of Elements n=1,3 and the de-activation of Elements n=0, 2. In this case, from the above expression, the focal length for the First Module $F_1$ may be given as the reciprocal of the sum of the reciprocals of the focal lengths of Elements 1 and 3, e.g., $$F_{1(1010)} = \left(\frac{1}{f_{1(3)}} + \frac{1}{\infty} + \frac{1}{f_{1(1)}} + \frac{1}{\infty}\right)^{-1} = \left(\frac{1}{f_{1(3)}} + 0 + \frac{1}{f_{1(1)}} + 0\right)^{-1} = -225 \text{ mm}.$$

The Image may be addressed at Output Plane m=10, a location 46.0 mm from the Second Module.

Table III below gives further example of the possible relationships between the Input Control Signal, Elements, Output Plane Location Index, Focal Length of the First Module and Output Plane Position. It will be understood by those with average skill in the art of digital electronics that Table III is similar to truth tables commonly used with digital-to-analog conversion, wherein the input control signal column contains digital input values and the Output Plane Location column contains the corresponding converted analog levels. However, in the case of an electronic digital-to-analog converter, the converted analog output levels are typically given in units of voltage, whereas for the present example of a combinatorial optical system, the converted output levels are given in units of distance, i.e., locations of the Output Plane. In this fashion, a Combinatorial Optical Processor may generally enable a form of digital-to-analog conversion wherein the converted analog signals represent one or more sequences of optical functions performed by the system. Embodiments of combinatorial optical systems may be employed such that the optical functions may include without limitation optical transforms, optical filter functions and optical operations such as magnification, image translation, angle scanning, wavefront modification, amplitude modulation, attenuation, phase modulation, frequency modulation and amplification, spatial filtering.

transform is related to an $(n+1)^{th}$ transform in the same way as an $(n-1)^{th}$ transform is related to the $n^{th}$ transform. In Table III, the $n^{th}$ output plane is located 0.1 mm from the $(n-1)^{th}$ output plane location. Although a simple arithmetic sequence is depicted in Table III, the analog set may be a geometric, logarithmic, exponential, or other sequence.

Three-Dimensional Display Based on Combinatorial Optics.

Figure 3:
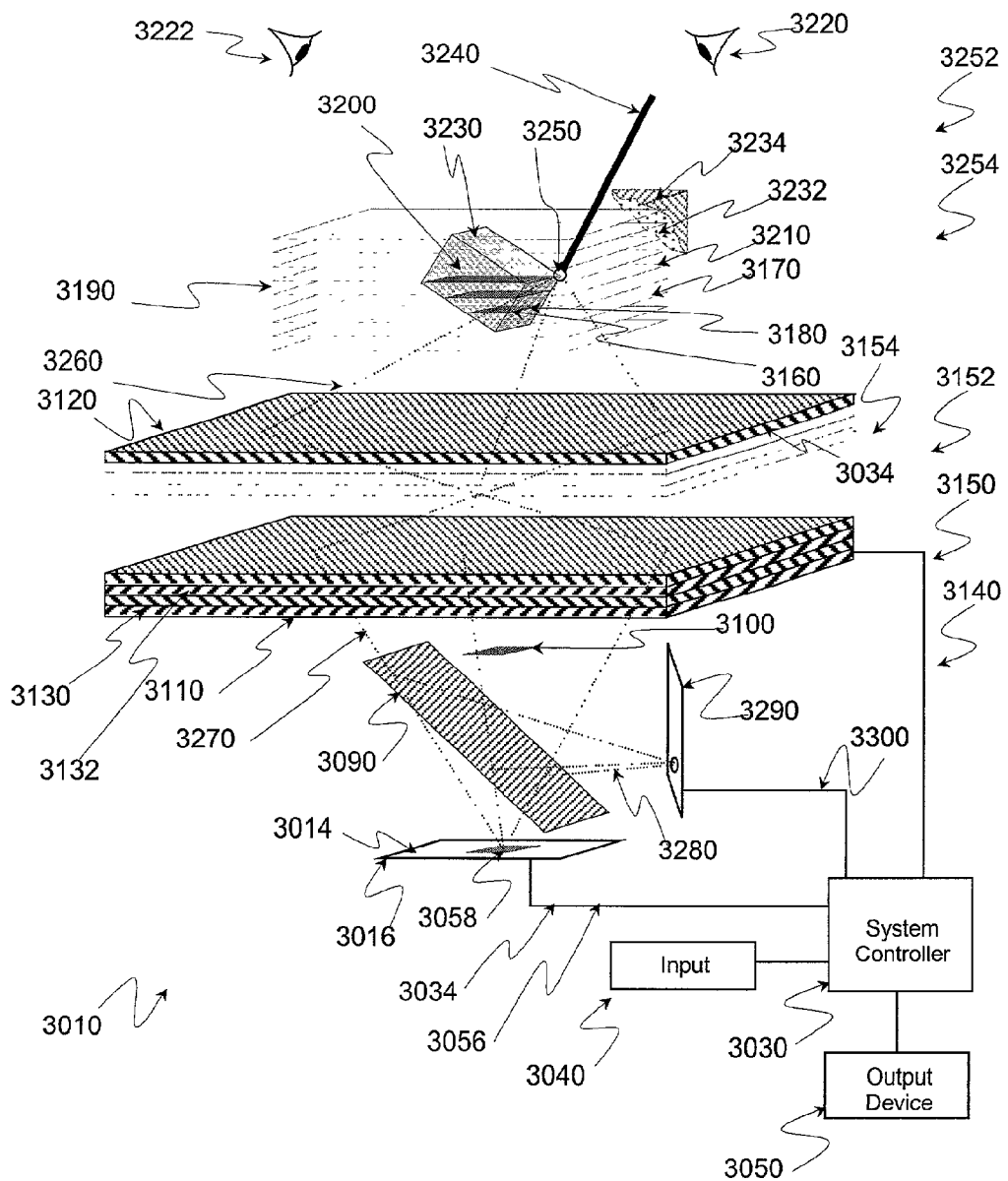
FIG. 3 depicts a schematic diagram illustrating a three-dimensional display system based on combinatorial optics according to an embodiment of the invention.

FIG. 3 shows a free-space randomly-addressable interactive three-dimensional display system (3010) based on combinatorial optics. The system (3010) generally includes one or more optical modules, e.g., a first module (3110) and a second module (3120), one or more of which may include one or more addressable optical elements. By way of example, the first module may include one or more addressable optical elements (3130) as described above. By way of example, the addressable optical elements (3130) may include without limitation active optical elements such as liquid crystals, polymer-dispersed liquid crystals, holographic polymer-dispersed liquid crystals, lenses or other optical elements dispersed in liquid crystals, electro-optics, nonlinear optics, electro-holographic optics, grating light valves, adaptive optics, varifocal mirrors, flexible mirror membranes, micro-electromechanical systems, variable lenses, and micro-mirrors. In the present embodiment of the invention, one or more of addressable optical elements (3130) may be actively switched between two states of operation. While in the present embodiment of the invention, such states comprise a pair of focal lengths, states may also include without limitation, two unique focal powers, aperture sizes, wedge angles and radii of curvature. In this fashion, the first Module (3110) may be driven by a digital signal comprising a binary bit string wherein each bit location in the string corresponds to a respective Element (3132), and wherein the digital values of the bits control the states of respective addressable optical elements (3130). While in the present invention, the addressable optical elements (3130) may be switched between two states, the

TABLE III

| Input Control Signal | Combination of n Elements in First Module (0 = de-activated; 1 = activated) | | | | Output Plane Location Index, m | Total focal length of First Module, $F_1$ (mm) | Output Plane Location (distance from Second Module) (mm) |
|---|---|---|---|---|---|---|---|
| | n = 3 | n = 2 | n = 1 | n = 0 | | | |
| 0000 | 0 | 0 | 0 | 0 | 0 | ∞ | 45.0 |
| 0001 | 0 | 0 | 0 | 1 | 1 | −2250 | 45.1 |
| 0010 | 0 | 0 | 1 | 0 | 2 | −1125 | 45.2 |
| 0011 | 0 | 0 | 1 | 1 | 3 | −750 | 45.3 |
| 0100 | 0 | 1 | 0 | 0 | 4 | −562.5 | 45.4 |
| 0101 | 0 | 1 | 0 | 1 | 5 | −450 | 45.5 |
| 0110 | 0 | 1 | 1 | 0 | 6 | −375 | 45.6 |
| 0111 | 0 | 1 | 1 | 1 | 7 | −321.43 | 45.7 |
| 1000 | 1 | 0 | 0 | 0 | 8 | −281.25 | 45.8 |
| 1001 | 1 | 0 | 0 | 1 | 9 | −250 | 45.9 |
| 1010 | 1 | 0 | 1 | 0 | 10 | −225 | 46.0 |
| 1011 | 1 | 0 | 1 | 1 | 11 | −204.55 | 46.1 |
| 1100 | 1 | 1 | 0 | 0 | 12 | −187.5 | 46.2 |
| 1101 | 1 | 1 | 0 | 1 | 13 | −173.08 | 46.3 |
| 1110 | 1 | 1 | 1 | 0 | 14 | −160.71 | 46.4 |
| 1111 | 1 | 1 | 1 | 1 | 15 | −150 | 46.5 |

In general, each different possible combination of the states for the element of the first module may produce a set of output plane locations that form an analog set. The analog set is a sequence of transforms between the object and the image. The sequence of transforms may be such that, for integer values of n between between 1 and N−1, an $n^{th}$ addressable optical elements (3130) may alternatively be actively switched between any number of states and driven by suitable control signals. For example, if Elements (3130) are capable of switching between sixteen states, then the corresponding control signal may comprise a string of hexadecimal values. The first module (3110) may be connected to a System Controller (3030) and may be driven by control signals (3140) via control conduits (3150).

The second module (3120) may also comprise one or more optical elements (3134). The optical elements (3134) may include without limitation lenses, prisms, mirrors, gratings, optical fiber and holographic optical elements. While in the present invention such elements (3134) include fixed or passive optical elements, the optical elements (3134) may include active or addressable optical elements including without limitation those elements described previously with respect to Elements (3130). Furthermore, in additional embodiments of the invention, the second module (3120) may be connected to the system controller (3030) and may be driven by control signals (3152) via control conduits (3154).

An Object Source (3014) is positioned at an object plane location (3016). The object source (3014) may include without limitation display sources such as liquid crystals, lasers, light emitting diodes, mirrors, holographic optical elements, and micro-electro-mechanical mirrors and any other display source. The object source (3014) may be connected to a system controller (3030) via one or more control conduits (3034). The system controller (3030) may include, without limitation, control electronics, processors, drivers, optical, electronic, acoustic, mechanical and other hardware, software and apparatus for generating, receiving and transmitting control signals and for enabling data links and communications between various electronic, optical, mechanical and other apparatus internal to and external to the system (3010). Furthermore, the control conduits (3034) may include without limitation data communications apparatus such as fiber optic, electrical, electronic, mechanical and other cables and wires, and optical, microwave, acoustic and other free-space communications links. An input device (3040) may be connected to the system controller (3030) via control conduits (3044). The input device (3040) may include data and sources of data external to the system including without limitation data storage devices, computers and communications networks. An output device (3050) may be connected to the system controller (3030) via control conduits (3054). The output device (3050) may include receivers of data external to the system including without limitation data storage devices, computer and communications networks. The object source (3014) may be driven by control signals (3056) thereby generating an object (3058). The object (3058) may include without limitation one or more displayed images, as well as other forms of optical or electromagnetic fields.

The object (3058) may be transmitted from object source (3014) and a portion of the radiation comprising the object (3080) may propagate through a partial reflector (3090). The partial reflector (3090) may include without limitation mirrors, wave plates, optical coatings, polarizers and optical gratings, holographic optics, flats, prisms, lenses, wedges, diffraction gratings, grating light valves. In the present embodiment of the Invention, partial reflector (3090) may be disposed between the object source (3014) and the first module (3110), however, the partial reflector (3090) may alternatively be employed at other locations in the system (3010). After propagating through the partial reflector (3090), radiation from the object (3100) may propagate through the first module (3110) and through the second module (3120). After propagating through first module (3110) and second module (3120), the radiation from the object (3160) may be focused at an image plane location (3170) thereby forming an image (3180). The image (3180) may be a relayed real image of the object (3058). In this fashion, the first module (3110) and the second module (3120) may perform the optical function of relay imaging of the object (3058) from an object plane location (3016) to the image (3180) positioned at the image plane location (3170). While in the present invention, system (3010) performs the optical function of relay imaging, the system (3010) may alternatively perform other optical functions, including, without limitation, image magnification, angular beam deflection and beam spot size magnification. Further, while the example depicted in FIG. 3 employs two modules, i.e., the first module (3110) and the second module (3120), any number of such modules, passive as well as active or switchable, may be employed in the System (3010) and may be controlled by respective control signals and control conduits.

The first module (3110) and, in other embodiments of the invention, the second module (3120), may be driven by control signals (3140) such that the image (3160) may be selectively focused at one or more image plane locations (3190) thereby forming a plurality of images (3200). The first module (3110), second module (3120) and object source (3014) may be synchronized such that a plurality of objects (3058) may be generated and relayed onto corresponding image plane locations (3210). The images (3200) may be generated and refreshed at a sufficiently rapid frequency and with sufficient brightness such that an observer (3220) viewing images (3200) may perceive images (3200) to be appearing simultaneously. In this fashion, a set of images (3200) may be generated which, when viewed together, form a composite three-dimensional Image (3230). Any number of observers (3222) may simultaneously view the three-dimensional Image (3230). The three-dimensional Image (3230) may be a real image and may exist in free space. Alternatively, the three-dimensional image (3230) may alternatively comprise without limitation virtual, two-dimensional and curved two-dimensional images. In other embodiments of the invention, an imaging Medium (3232) and an imaging chamber (3234) may be employed near or coinciding with at least a portion of three-dimensional image (3230).

A pointer (3240) may be positioned to coincide with a portion of the images (3200). A portion of the pointer (3240), e.g., a pointer tip (3250)), such as a rounded tip or point, may be reflective to a portion of the light or spectrum comprising the Images (3200). The pointer (3240) may include without limitation physical objects such as a human finger or pointing device such as a pen or wand. In this fashion, the observer (3220) may position the pointer tip (3250) in coincidence with a portion of three-dimensional image (3230). In the present embodiment of the invention, the pointer (3240) may be not physically connected to the system (3010). However, in additional embodiments of the invention, the pointer (3240) may be connected to the system controller (3030) and may be driven by control signals (3252) via control conduits (3254). The pointer (3240) may further include apparatus that provides the observer (3220) with physical feedback related to three-dimensional image (3230). Such physical feedback apparatus may include, without limitation, gloves, pressure sensors and other force feedback devices. A portion of the light or spectrum comprising the images (3200), e.g., reflected Image light (3260), may then be reflected off the pointer (3170). A portion of reflected image Light (3260) may then propagate through the second module (3120) and through the first Module (3110). After propagating through the second module (3120) and through the first module (3110), a portion of the reflected image light (3270) may then reflect off the partial reflector (3090). After reflection off the partial reflector (3090), the reflected image light (3280) may then propagate on to a detector (3290). The detector (3290) may include without limitation photodetectors and cameras employing such technology as CMOS, photomultiplier tubes, silicon, germanium, and semiconductor detectors and detector arrays. The detector (3290) may be connected to the system controller (3030) via one or more control conduits (3300). The presence and location of the pointer (3240) may be identified and utilized to enable the observer (3220) to interact with the generation of three-dimensional image (3230).

In an alternative embodiment, a detector, or detector array may be placed at or proximate the location of the object source (3014). Similarly, a detector array may be placed at or proximate the location of the image plane locations (3190), e.g., in applications that utilize a system of the type shown in FIG. 3 as part of a telescope or microscope.

Linked Combinatorial Optical Processors

Figure 4A:
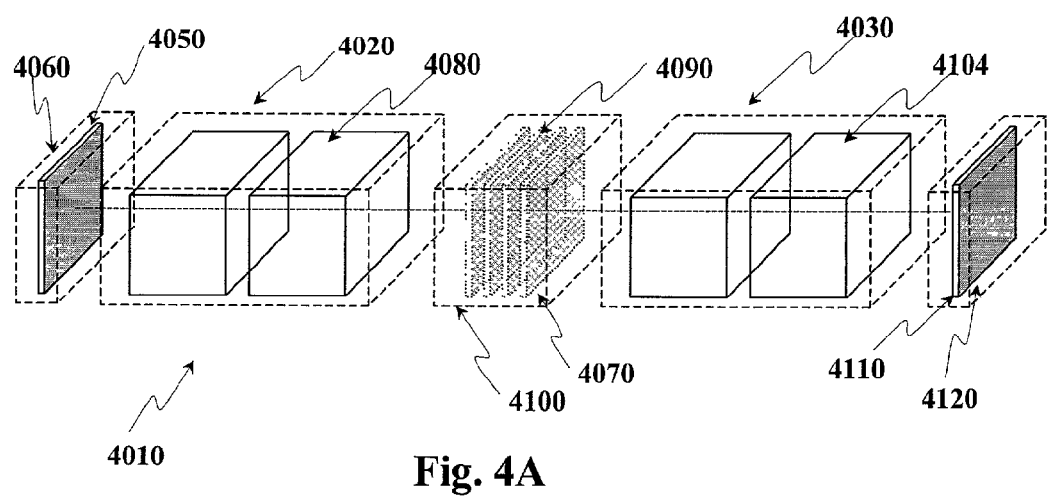
FIGS. 4A–4B depict schematic diagrams illustrating examples of apparatus that use linked Combinatorial Optical Processor signal processing systems according to an embodiment of the present invention.
Figure 4B:
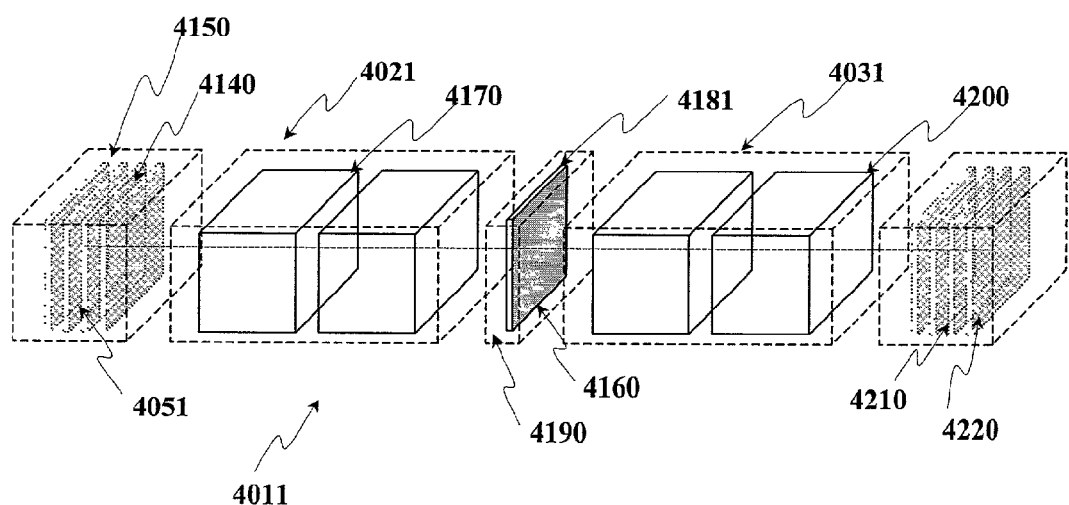

It is possible to optically link two Combinatorial Optical Processors for advanced image processing. By way of example, FIGS. 4A–4B illustrate additional embodiments of the invention that utilize linked Combinatorial Optical Processors. FIG. 4A depicts a system (4010) that includes without limitation a first Combinatorial Optical Processor (4020) and a second Combinatorial Optical Processor (4030) wherein the first system (4020) and second system (4030) may be linked to each other. Each of the first system (4020) and the second system (4030) may include one or more optical modules (4080), (4100), (4104) of the types described above with respect to FIGS. 1–3. By way of example, in FIG. 4A an object (4050) may be transmitted through the first system (4020). The object (4050) may be two-dimensional and may include without limitation data positioned at an object plane location (4060). After propagating through the first system (4020), object (4050) may have received one or more transform operations. Examples of transform operations may include without limitation the translation of object (4050) from its original position at the object Plane Location (4060) to one or more intermediate plane locations (4070). The intermediate plane locations (4070) may be selected by the state of one or more optical modules (4080) employed in the first system (4020). In this fashion, the object (4050) may be transformed into an intermediate image (4090). The intermediate image (4090) may include three-dimensional images or arrays of data. One or more intermediate optical modules (4100) may be incorporated coinciding with at least a portion of the intermediate image (4090). The intermediate modules (4100) may include without limitation passive or active optical elements, lenses, prisms, liquid crystal, arrays of optical elements, mirrors, gratings, holographic optical elements, nonlinear optics, MEMS devices, films, wave plates, optical coatings, polarizers, flats, wedges, diffraction gratings, grating light valves, imaging media and imaging chambers, amplitude and phase modulators and amplitude and phase masks. After being transmitted through the intermediate plane locations (4070), the object (4050) may propagate through the second system (4030). The second system (4030) may serve to perform one or more transform operations on intermediate image (4090) wherein the transform operations are selected by the state of the modules (4104) of the second system (4030). For example, the transform operations may include the translation of the intermediate image (4090) to an image (4110) positioned at an image plane location (4120). The image (4110) may be a two-dimensional image or array of data. Applications of such a system (4010) may include without limitation optical or holographic data storage wherein two-dimensional arrays of information, such as data that may be generated by liquid crystal light modulators, are optically written to and read from selected regions of a three-dimensional optical storage medium such as a lithium niobate crystal.

FIG. 4B depicts a three-dimensional imaging system (4011) that is a variation on the Combinatorial Optical Processor (4010) of FIG. 4A. The system (4011) includes without limitation a first Combinatorial Optical Processor (4021) and a second Combinatorial Optical Processor (4031) wherein the first system (4021) and second system (4031) may be linked to each other. Each of the first system (4021) and the second system (4031) may include one or more optical modules (4170), (4190), (4200) of the types described above with respect to FIGS. 1–3. As shown in FIG. 4B an object (4051) may be transmitted through the first system (4021) wherein the object (4050) may include without limitation a three-dimensional image (4140) positioned at one or more object plane locations (4150). After propagating through the first system (4021), the object (4051) may have received one or more transform operations. Examples of transform operations may include without limitation the translation of the object (4051) from the object plane locations (4150) to one or more intermediate plane locations (4160) wherein the intermediate plane locations (4160) may be selected by the state of the modules (4170) employed in the first system (4020). In this fashion, an intermediate image (4180) may be formed at one or more intermediate plane locations (4160). The intermediate image (4180) may include two-dimensional images or arrays of data. One or more intermediate optical modules (4190) may be incorporated coinciding with at least a portion of the intermediate image (4180). The intermediate optical modules (4190) may include without limitation passive or active optical elements, lenses, prisms, liquid crystal, arrays of optical elements, mirrors, gratings, holographic optical elements, nonlinear optics, MEMS devices, films, wave plates, optical coatings, polarizers, flats, wedges, diffraction gratings, grating light valves, imaging media and imaging chambers, slow light media, amplitude and phase modulators and amplitude and phase masks. After being transmitted through the intermediate plane locations (4160), the object (4050) may propagate through the second system (4031). The second system (4031) may serve to perform one or more transform operations on the intermediate image (4180) wherein the transform operations are selected by the state of the modules (4200) employed within the second system (4031). For example, the intermediate image (4180) may be transformed to an Image (4210) positioned at one or more image plane locations (4220). In this fashion, the image (4210) may include three-dimensional images. Applications of such a system (4130) may include without limitation optical or holographic data processing wherein three-dimensional arrays of information, such as data stored within lithium niobate crystals, may be modified or processed by liquid crystal light modulators.

Compound Linked Combinatorial Optical Processors

Figure 5:
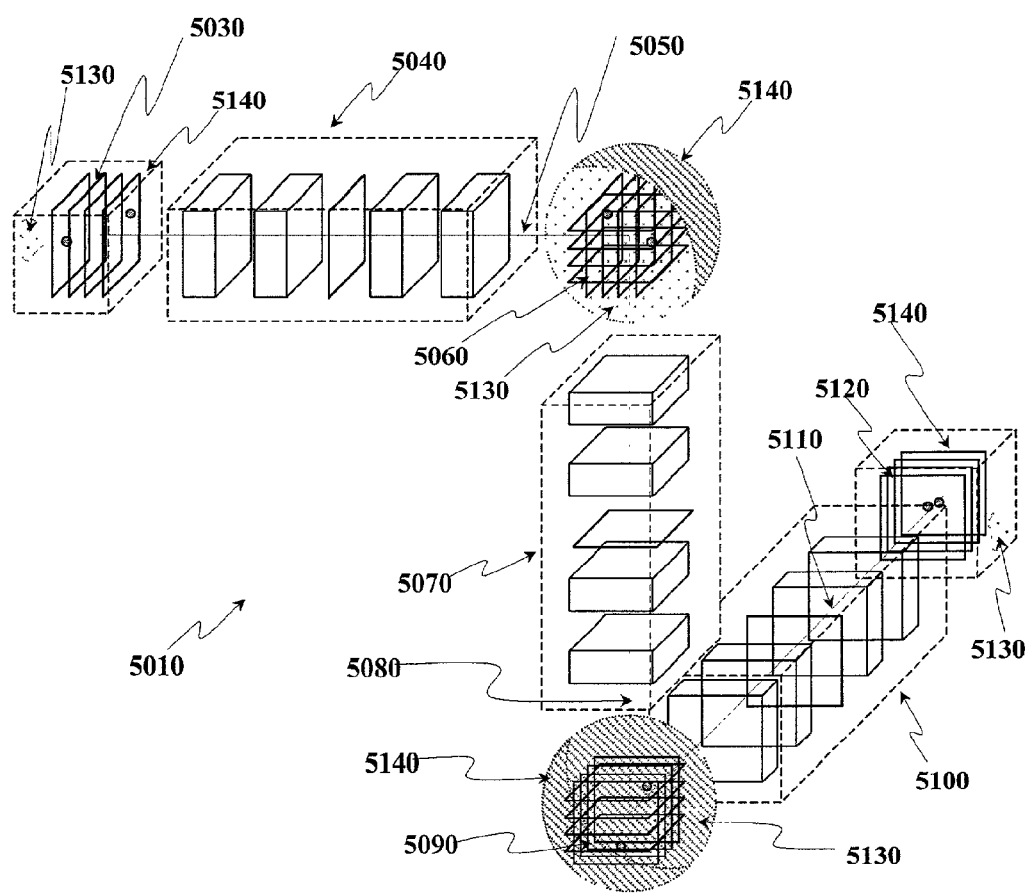
FIG. 5 depicts a schematic diagram illustrating an alternative example of a linked Combinatorial Optical Processor signal processing system according to an embodiment of the invention.

Two or more linked systems of the types depicted in FIGS. 4A–4B may be linked together to form a compound linked system. FIG. 5 illustrates an embodiment of the invention wherein a compound linked system (5010) may be comprised of a plurality of linked Combinatorial Optical Processors wherein an image, generated by a first system, may function as an object for transmission through a second system. An object (5030) may be transmitted through a first linked System (5040) having a first optical axis (5050). The first linked system may have features in common with the system (4011) described above with respect to FIG. 4B. The first linked system (5040) may perform optical transforms or processing on the object (5030) thereby forming a first intermediate image (5060). The first intermediate image (5060) may be transmitted through a second linked system (5070) having a second optical axis (5080). The second optical axis (5080) may have an orientation orthogonal to the first optical axis (5050). The second linked system may have features in common with the system (4011) described above with respect to FIG. 4B. The second linked system (5070) may serve to perform optical transforms or processing on the first intermediate image (5060) thereby forming a second intermediate image (5090). In the example depicted in FIG. 5, both the first intermediate image (5060) and the second intermediate image (5090) are three-dimensional images. The second intermediate image (5090) may be transmitted through a third linked system (5100) having a third optical axis (5110). The third optical axis (5110) may have an orientation orthogonal to both the first optical axis (5050) and the second optical axis (5080). The third linked system may have features in common with the system (4011) described above with respect to FIG. 4B. The third linked system (5100) may serve to perform optical transforms or processing on the second intermediate image (5090) thereby forming an image (5120), which may be a three-dimensional image. In other embodiments of the invention, one or more imaging media (5130) and one or more imaging chambers (5140) may coincide with at least a portion of one or more of the object (5030), the first Intermediate image (5060), the second intermediate image (5090) and the image (5120). The imaging medium (5130) and imaging chamber (5140) may serve to enhance certain properties, including without limitation the brightness and scatter angle of the light comprising one or more of object (5030), the first intermediate image (5060), the second intermediate image (5090) and the image (5120). In other embodiments of the Invention, the first optical axis (5050), the second optical axis (5080) and the third optical axis (5110) may be oriented at any angles with respect to each other. Applications of such a compound linked system (5010) may include without limitation optical computers and data storage wherein the system (5010) may serve to perform matrix operations on arrays of optical data such as data stored within lithium niobate.

Although the above embodiments are described in terms of optical modules for processing radiation in the form of light, those of skill in the art will recognize that the above embodiments may apply equally well to systems for imaging or processing other forms of radiation, Such other forms of radiation may include, radiofrequency, microwave, electromagenetic, acoustic, and other forms of radiation. Furthermore, in many embodiments of the present invention the direction of propagation of radiation, e.g., light, may reversed in an optical system. Thus, it is within the scope of the present invention to reverse the locations of the object and the image in systems of the types shown in FIGS. 1–5.

Furthermore, although a few specific embodiments of the invention have been described, e.g. with respect to imaging systems and three-dimensional displays, the present combinatorial optical signal processing architecture may be readily adapted to the design of optical instruments without departing from the scope of these teachings. Such optical instruments include, without limitation, eyeglasses, binoculars, telescopes, microscopes, optical processors, optical cross-connects, optical interconnects, optical computers, optical light collectors, optical resonators, adaptive optical systems, optical imaging systems, non-imaging optical systems, vision systems, optical communication systems, and optical data storage systems.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for".

What is claimed is:

1. A combinatorial optical processor, comprising one or more optical modules; wherein at least one of the one or more optical modules includes N addressable optical elements, where N is an integer greater than 1, wherein each addressable optical element is characterized by a first state focal length when the addressable optical element is in a first state and a second state focal length when the addressable optical element is in a second state, wherein the first state focal lengths for all N addressable optical elements are the same, and wherein the second state focal lengths of the N addressable optical elements are unique and, except for a smallest second state focal length, each second state focal length is twice as large as another second state focal length, wherein the N addressable optical elements are configured such that, depending on a state of each addressable optical element, the combinatorial optical processor may provide at least $2^N$ addressable filter functions, wherein the N addressable optical elements are stacked in series such that light forming an image sequentially passes through all N addressable optical elements for all $2^N$ addressable filter functions, wherein each of the at least $2^N$ addressable filter functions produces a unique transform between an object and an image whereby there are at least $2^N$ unique transforms, wherein each unique transform produces an image of the object at a different image location, whereby there are $2^N$ different image locations.

2. The combinatorial optical processor of claim 1 wherein the at least $2^N$ transforms form a set of related transforms.

3. The combinatorial optical processor of claim 2 wherein an $n^{th}$ transform is related to an $(n+1)^{th}$ transform in the same way as an $(n-1)^{th}$ transform is related to the $n^{th}$ transform, wherein n is an integer between 1 and N−1.

4. The combinatorial optical processor of claim 3 wherein, for an object at a given object location, each of the at least $2^N$ transforms images the object at a different addressable output plane location, whereby there are at least $2^N$ addressable output plane locations.

5. The combinatorial optical processor of claim 4 wherein each of the at least $2^N$ addressable output plane locations lies along the same optic axis as the input plane.

6. The combinatorial optical processor of claim 4 wherein the at least $2^N$ addressable output plane locations are uniformly spaced apart.

7. The combinatorial optical processor of claim 2 wherein each of the at least $2^N$ transforms images the object at a different addressable magnification, whereby there are at least $2^N$ addressable magnifications.

8. The combinatorial optical processor of claim 2 wherein each of the at least $2^N$ transforms images the object at a different addressable beam deflection angle, whereby there are at least $2^N$ addressable beam deflection angles.

9. The combinatorial optical processor of claim 1 wherein one or more of the addressable optical elements are selected from the group consisting of variable efficiency optics, holographic optical elements, and nonlinear optics, holographic optical elements imbedded in electrically-activated liquid crystals and electrooptic diffractive optical elements in domain patterned ferroelectric materials.

10. The combinatorial optical processor of claim 1 wherein the N addressable optical elements are randomly addressable.

11. The combinatorial optical processor of claim 10 wherein each addressable optical element is characterized by at least two states.

12. The combinatorial optical processor of claim 11 wherein each of the at least two states for a given addressable optical element is characterized by a different value for an optical property of the given addressable optical element.

13. The combinatorial optical processor of claim 12 wherein each addressable optical element is a holographic optical element.

14. The combinatorial optical processor of claim 13 wherein the holographic optical element is a lens incorporated within a liquid crystal structure.

15. The combinatorial optical processor of claim 12 wherein the optical property is a focal length.

16. The combinatorial optical processor of claim 12 wherein between 2 and N randomly addressable optical elements are configured as a stack such that a total focal length of the stack $f_{tot}$ may be approximated by:

$$f_{tot} = \left(\frac{1}{f_1} + \frac{1}{f_2} \ldots \frac{1}{f_n}\right)^{-1},$$

wherein $f_1, f_2 \ldots f_n$ are the focal lengths of the n addressable optical elements.

17. The combinatorial optical processor of claim 16 wherein the stack is a stack of thin lenses.

18. The combinatorial optical processor of claim 10 wherein the unique transform is selected from the group consisting of image distance transforms, object distance transforms, image magnification transforms, image plane curvature transforms, object plane curvature transforms, angular beam deflection transforms, spatial frequency transforms and beam spot size transforms.

19. The combinatorial optical processor of claim 10 wherein a state of each of the N addressable optical elements may be determined by a control signal.

20. The combinatorial optical processor of claim 19 wherein the control signal is chosen from the group consisting of electric, optical, thermal, mechanical, magnetic, acoustic and electromagnetic control signals.

21. The combinatorial optical processor of claim 19 wherein the control signal is a digital control signal.

22. The combinatorial optical processor of claim 21 wherein the digital control signal is an N-bit control signal.

23. The combinatorial optical processor of claim 22 wherein each bit of the digital control signal corresponds to a unique one of the N addressable optical elements, whereby a value of a given bit determines a state of a corresponding one of the N addressable optical elements.

24. The combinatorial optical processor of claim 21 wherein the combinatorial optical processor is configured to convert the digital control signal to one or more analog output optical signals.

25. The combinatorial optical processor of claim 19, further comprising a control conduit coupled to one or more of the addressable optical elements.

26. A combinatorial optical processor, comprising one or more optical modules; wherein at least one of the one or more optical modules includes N randomly addressable optical elements, where N is an integer greater than 1, wherein each addressable optical element is characterized by a first state focal length when the addressable optical element is in a first state and a second state focal length when the addressable optical element is in a second state, wherein the first state focal lengths for all N addressable optical elements are the same, and wherein the second state focal lengths of the N addressable optical elements are unique and, except for a smallest second state focal length, each second state focal length is twice as large as another second state focal length, wherein the N randomly addressable optical elements are stacked in series such that light forming an image sequentially passes through all N addressable optical elements, wherein the N randomly addressable optical elements are configured such that, depending on a state of each randomly addressable optical element, the combinatorial optical processor may provide at least $2^N$ randomly addressable filter functions, wherein the N randomly addressable optical elements are stacked in series such that light forming an image sequentially passes through all N addressable optical elements for all $2^N$ randomly addressable filter functions, wherein each of the at least $2^N$ randomly addressable filter functions produces a unique transform between an object and an image whereby there are at least $2^N$ different transforms, wherein an $n^{th}$ transform is related to an $(n+1)^{th}$ transform in the same way as an $(n-1)^{th}$ transform is related to the $n^{th}$ transform, wherein n is an integer between 1 and N−1, wherein one or more of the optical modules includes a nonlinear optical medium having one or more subsections that define one or more of the N addressable optical elements, wherein each unique transform produces an image of the object at a different one of the $2^N$ image locations.

27. The combinatorial optical processor of claim 26 wherein the optical processor having N randomly addressable optical elements includes an optical medium having one or more subsections that define one or more of the randomly addressable optical elements; and means for altering the optical properties of the subsections.

28. The combinatorial optical processor of claim 1 wherein the one or more optical modules including N addressable optical elements includes an optical medium having one or more subsections that define one or more of the addressable optical elements; and means for altering the optical properties of the subsections.

29. The combinatorial optical processor of claim 28 wherein the means for altering the optical properties provide one or more optical address beams.

30. The combinatorial optical processor of claim 29 wherein optical medium is an electro-optic medium.

31. The combinatorial optical processor of claim 30 wherein the means for altering the optical properties include one or more contact pads disposed proximate the optical medium and a voltage source coupled to one or more of the contact pads.

32. The combinatorial optical processor of claim 28 wherein the one or more optical modules including N addressable optical elements includes an optical medium having one or more subsections that define the one or more addressable optical elements.

33. The combinatorial optical processor of claim 32 wherein two or more of the optical modules are linked and oriented relative to each other such that optical transforms may be performed along two or more axes relative to an axis of propagation.

34. The combinatorial optical processor of claim 33 wherein the two or more modules comprise a first module and a second module wherein each of the first and second modules performs a one-dimensional lens optical transform, whereby the optical processor performs two one-dimensional lens optical transforms and wherein the first and second modules are relatively oriented such that the two one-dimensional lens optical transforms are substantially perpendicular to each other whereby optical transforms in two dimensions can be achieved.

35. The combinatorial optical processor of claim 32 wherein the optical medium exhibits optical nonlinearities.

36. The combinatorial optical processor of claim 35 wherein the optical nonlinearities include second order nonlinearities.

37. The combinatorial optical processor of claim 35 wherein the optical nonlinearities include third order nonlinearities.

38. The combinatorial optical processor of claim 32 wherein the optical medium includes a material selected from the group of $KH_2PO_4$, KDP, or $LiNbO_3$.

39. The combinatorial optical processor of claim 32, further comprising one or more address beam sources, wherein each address beam source may produce an address beam that interacts with a corresponding subsection of the optical medium to alter one or more optical properties of the subsection.

40. The combinatorial optical processor of claim 32 wherein optical medium includes an electro-optic medium.

41. The combinatorial optical processor of claim 40 wherein the electro-optic medium includes a liquid crystal.

42. The combinatorial optical processor of claim 41 wherein the liquid crystal may have two or more states of refractive index as determined by an electric field applied across at least a portion of the electro-optic medium.

43. The combinatorial optical processor of claim 40, further comprising one or more contact pads disposed proximate the optical medium.

44. The combinatorial optical processor of claim 43, further comprising a voltage source coupled to one or more of the contact pads.

45. The combinatorial optical processor of claim 43, further comprising one or more dispersed optics disposed proximate one or more of the contact pads.

46. The combinatorial optical processor of claim 45, wherein the dispersed optics include refractive, diffractive and binary optic lenses, micro-optic lenslets, bragg gratings, prisms, holographic optical elements, liquid crystals, ferro-electrics, semiconductors, electro-optics, polymers, thin films, glass or plastic.

47. The combinatorial optical processor of claim 45, further comprising one or more dispersed optics disposed within the electro-optic medium.

48. The combinatorial optical processor of claim 47, wherein the dispersed optics include refractive, diffractive and binary optic lenses, micro-optic lenslets, bragg gratings, prisms, holographic optical elements, liquid crystals, ferro-electrics, semiconductors, electro-optics, polymers, thin films, glass or plastic.

49. The combinatorial optical processor of claim 47, wherein the dispersed optics include one or more birefringent materials one or more optically isotropic materials.

50. The combinatorial optical processor of claim 49 wherein the dispersed optics are configured such that along a first polarization axis, the materials comprising the dispersed optics have a common refractive index and wherein along a second polarization axis, the materials comprising the dispersed optics have two or more refractive indices.

51. The combinatorial optical processor of claim 49 wherein the contact pads include one or more polarization rotators.

52. The combinatorial optical processor of claim 51 wherein the polarization rotators are selected from the group of dichroic films, liquid crystals, and electro-optic half-wave plates.

53. The combinatorial optical processor of claim 49 wherein the contact pads include one or more polarizers.

* * * * *